US012100412B2

(12) United States Patent
Kim et al.

(10) Patent No.: US 12,100,412 B2
(45) **Date of Patent: *Sep. 24, 2024**

(54) TRANSFORMER WITH GAUSSIAN WEIGHTED SELF-ATTENTION FOR SPEECH ENHANCEMENT

(71) Applicant: Samsung Electronics Co., Ltd., Gyeonggi-do (KR)

(72) Inventors: JaeYoung Kim, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 374 days.

This patent is subject to a terminal disclaimer.

(21) Appl. No.: 17/543,057

(22) Filed: Dec. 6, 2021

(65) Prior Publication Data

US 2022/0093116 A1 Mar. 24, 2022

Related U.S. Application Data

(63) Continuation of application No. 16/591,117, filed on Oct. 2, 2019, now Pat. No. 11,195,541.

(60) Provisional application No. 62/844,954, filed on May 8, 2019.

(51) Int. Cl.
*G10L 21/00* (2013.01)
*G10L 21/0232* (2013.01)
*G10L 21/0264* (2013.01)

(52) U.S. Cl.
CPC ...... *G10L 21/0264* (2013.01); *G10L 21/0232* (2013.01)

(58) Field of Classification Search
CPC ........ G06N 3/0454; G06N 3/08; G06N 20/00; G06N 3/0481; G06N 3/02; G06N 3/04; G06N 20/10; G06N 20/20; G06N 7/005; G10L 15/063; G10L 15/02; G10L 15/16; G10L 25/30; G10L 15/07; G10L 15/20; G10L 21/0232; G10L 21/0264
See application file for complete search history.

(56) References Cited

U.S. PATENT DOCUMENTS

| | | | | |
|---|---|---|---|---|
| 8,170,879 | B2 | 5/2012 | Nongplus | |
| 8,639,502 | B1 | 1/2014 | Boucheron | |
| 10,276,179 | B2 | 4/2019 | Tashev | |
| 11,195,541 | B2 * | 12/2021 | Kim | G10L 21/0232 |

(Continued)

OTHER PUBLICATIONS

Roth, W., Schindler, G., Fröning, H., & Pernkopf, F. Training discrete-valued neural networks with sign activations using weight distributions. In Machine Learning and Knowledge Discovery in Databases: European Conference, ECML PKDD 2019, Würzburg, Germany, Sep. 16-20, 2019, Proceedings (Year: 2019).*

(Continued)

*Primary Examiner* — Edgar X Guerra-Erazo
(74) *Attorney, Agent, or Firm* — The Farrell Law Firm, P.C.

(57) ABSTRACT

A method and system for providing Gaussian weighted self-attention for speech enhancement are herein provided. According to one embodiment, the method includes receiving an input noise signal, generating a score matrix based on the received input noise signal, and applying a Gaussian weighted function to the generated score matrix.

18 Claims, 3 Drawing Sheets

(56) References Cited

U.S. PATENT DOCUMENTS

| | | | |
|---|---|---|---|
| 2004/0117183 | A1 | 6/2004 | Deligne |
| 2004/0181409 | A1 | 9/2004 | Gong |
| 2007/0055508 | A1 | 3/2007 | Zhao |
| 2008/0215321 | A1 | 9/2008 | Droppo |
| 2018/0254050 | A1 | 9/2018 | Tashav |

OTHER PUBLICATIONS

Sperber, Matthias et al., "Self-Attentional Acoustic Models", arXiv preprint arXiv:1803.09519V2, Jun. 18, 2018, 5 pages.
Maosheng Guo et al., Gaussian Transformer: A Lightweight Approach for Natural Language Interference, (AAAI-19), Jan. 27, 2019, 8 pages.
Korean Office Action dated Nov. 28, 2023 issued in counterpart application No. 10-2020-0038893, 2 pages.
Robert Rehr et al., "On the Importance of Super-Gaussian Speech Priors for Machine-Learning Based Speech Enhancement", IEEE/ACM Transactions on Audio, Speech and Language Processing, 2017, p. 357-366.
Li Chal et al., "Gaussian Density Guided Deep Neural Network for Single-Channel Speech Enhancement", IEEE International Workshop on Machine Learning for Signal Processing, 2017, p. 1-6.
Achintya Kundu et al., "GMM Based Bayesian Approach to Speech Enhancement in Signal/Transform Domain", IEEE International Conference on Acoustics, Speech and Signal Processing, 2008, pp. 4893-4896.
Vaswani, Ashish, et al. "Attention is all you need." Advances in Neural Information Processing Systems. 2017, pp. 11.
Dean, David B., et al. "The QUT-NOISE-TIMIT Corpus for the Evaluation of Voice Activity Detection Algorithms." Proceedings of Interspeech 2010 (2010), pp. 6.
Kim, Jaeyoung, Mostafa El-Kharmy, and Jungwon Lee. "End-to-End Multi-Task Denoising for Joint SDR and PESQ Optimization." arXiv preprint arXiv:1901.09146 (2019), pp. 10.
Chang, Xuankai et al., "Monaural Multi-Talker Speech Recognition with Attention Mechanism and Gated Convolutional Networks", Interspeech 2018, Hyderabad, Sep. 2-6, 2018, pp. 5.
Sperber, Matthias et al., "Self-Attentional Acoustic Models", arXiv preprint arXiv:1803.09519, Sep. 2018, pp. 5.
Shin, Joongbo et al., "Effective Sentence Scoring Method using Bidirectional Language Model for Speech Recognition", arXiv:1905.06655v1, May 16, 2019, pp. 5.
Jeon, Yougneun et al., "Gaussian Noise Reduction Algorithm using Self-similarity", IEIE 2007-44SP-5-1, Sep. 2007, pp. 10.
Zhang, Yu et al., "Very Deep Convolutional Networks for End-to-End Speech Recognition", arXiv:1610.03022, Oct. 10, 2016, pp. 5.
Yu, Chengzhu et al., "A Multistage Training Framework for Acoustic-to-Word Model", 10.21437/Interspeech.2018-1452, Sep. 6, 2018, pp. 5.
Shan, Changhao et al., "Attention-Based End-to-End Speech Recognition on Voice Search", arXiv:1707.07167v3, Feb. 13, 2018, pp. 5.

* cited by examiner

300

TRANSFORMER WITH GAUSSIAN WEIGHTED SELF-ATTENTION FOR SPEECH ENHANCEMENT

PRIORITY

This application is a continuation of U.S. Ser. No. 16/591,117, which was filed in the United States Patent and Trademark Office (USPTO) on Oct. 2, 2019, and based on and claims priority under 35 U.S.C. § 119(e) to U.S. Provisional Patent Application Ser. No. 62/844,954, which was filed in the USPTO on May 8, 2019, the entire content of each of which is incorporated herein by reference.

FIELD

The present disclosure is generally related to a speech processing system. In particular, the present disclosure is related to a system and method for providing a transformer with Gaussian weighted self-attention for speech enhancement.

BACKGROUND

A transformer uses self-attention to compute symbol by symbol correlations in parallel over the entire input sequence, which are used to predict similarity ratios between the target and neighboring context symbols. The predicted ratios are normalized by a softmax function and used to combine input context symbols for the next layer output.

Compared with recurrent networks such as long short-term memory (LSTM) or gated recurrent unit (GRU), a transformer may be configured to parallelize operations but also transparent to all context symbols with the same path length. The path length is the number of steps to traverse for the operation and the shorter the path length is, the easier the learning dependency between them becomes. Typical recurrent models need path length proportional to their symbol distance. On the contrary, a transformer has constant path length over the entire context symbols, which is the one of the strengths in a transformer.

The transformer has recently replaced recurrent networks (e.g., LSTM, GRU) on many neuro-linguistic programming (NLP) tasks by presenting the state of the art performance. However, a transformer has not been reported to show performance on speech or image denoising problems. The main issue is that the speech denoising problem is different from typical NLP tasks and equal path length attention model in the transformer is not compatible with physical characteristics of speech signal. For example, noise or signal correlation decreases as the distance between two correlated components gets larger. Therefore, self-attention can have accidently high correlation with context remotely located.

SUMMARY

According to one embodiment, a method includes receiving an input noise signal, generating a score matrix based on the received input noise signal, and applying a Gaussian weighted function to the generated score matrix.

According to one embodiment, a system includes a memory and a processor configured to receive an input noise signal, generate a score matrix based on the received input noise signal, and apply a Gaussian weighted function to the generated score matrix.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
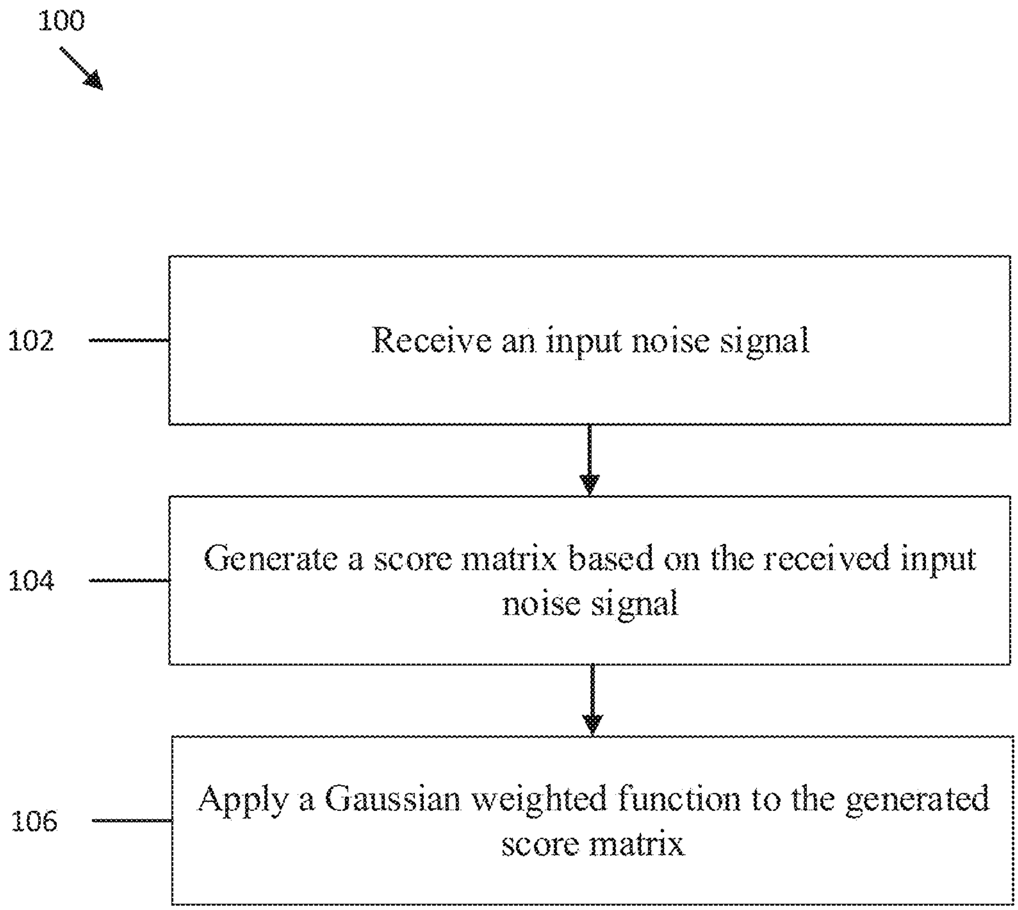
FIG. 1 illustrates a flowchart of a method for Gaussian weighted self-attention for speech enhancement, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In one embodiment, the present system and method provides Gaussian weighted self-attention for speech denoising. For the self-attention, query and key correlation is used to generate attention weights after a softmax function.

FIG. 1 illustrates a flowchart 100 of a method for Gaussian weighted self-attention for speech enhancement, according to an embodiment. At 102, a system receives an input noise signal.

Figure 2:
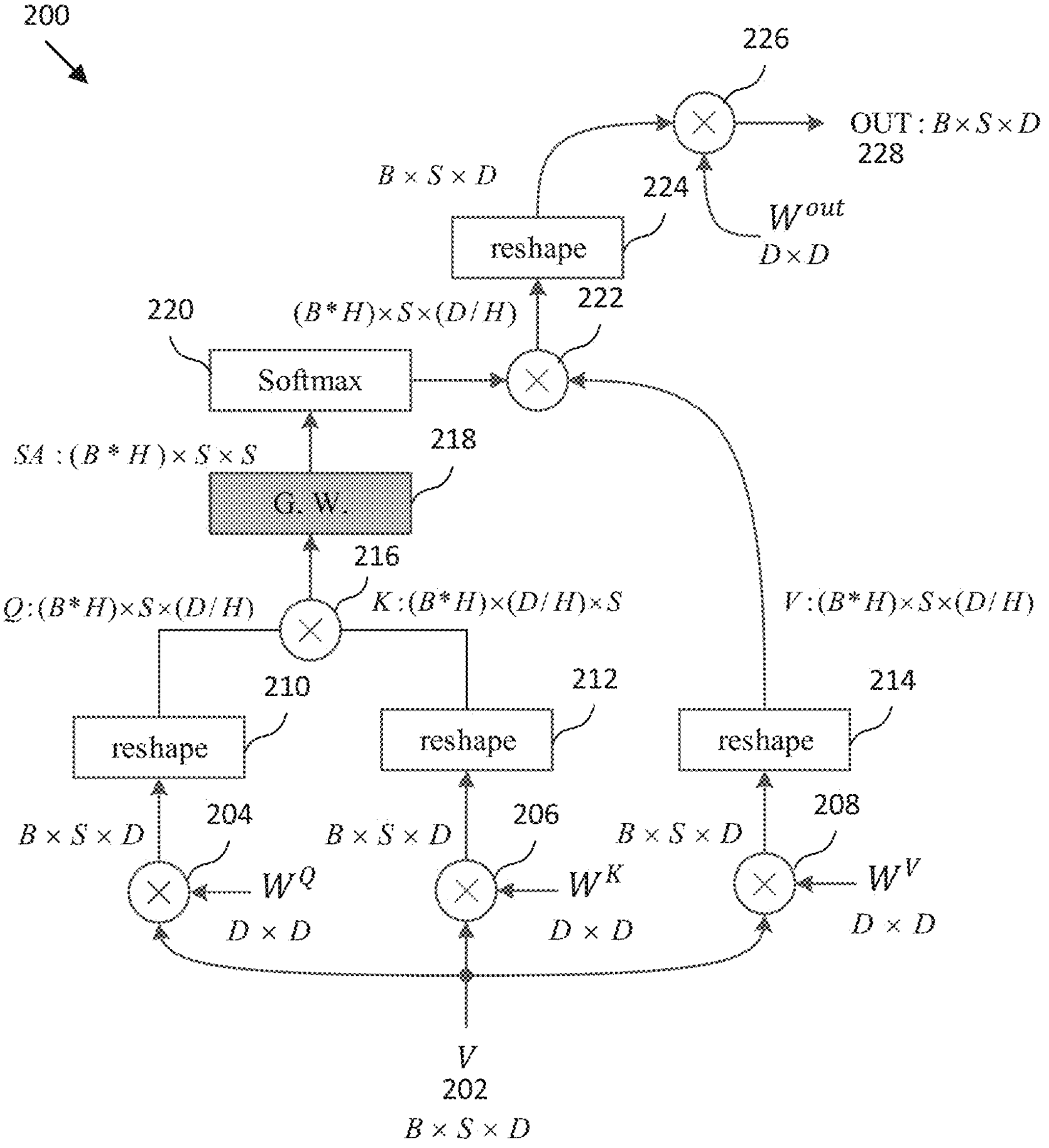
FIG. 2 illustrates a diagram of a system for Gaussian weighted self-attention for speech enhancement, according to an embodiment.

FIG. 2 illustrates a diagram of a system for Gaussian weighted self-attention for speech enhancement, according to an embodiment. For example, the system 200 receives an input noise signal 202.

At 104, the system generates a score matrix based on the received noise input signal. For example, the system 200 processes the input signal 202 through three separate batch matrix multiplication operations 204, 206 and 208, which receives trainable parameters $W^Q$, $W^K$, $W^V$, respectively, for the multiplication operation with the input signal 202. V represents a value matrix, K represents a key matrix, and Q represents a query matrix. B represents the batch size, S represents the sequence size, and represents the input dimension. The system 200 processes the parameters $W^Q$, $W^K$, $W^V$ through respective reshape operations 210, 212 and 214, which divide the input dimension according to the number of attention heads H. The system 200 processes the output of the reshape operation 210 pertaining to the $W^Q$ parameter, and the output of the reshape operation 212 pertaining to the $W^K$ parameter into a batch matrix multiplication operation 216, which produces the score matrix as in Equation (1):

$$S_h = \left(\frac{Q_h K_h^T}{\sqrt{d}}\right) \tag{1}$$

where $Q_h$ is the query matrix, $K_h^T$ is the key matrix, h is the header index, d is the input dimension, and $S_h$ is the score matrix, $Q_h$, $K_h$ and $V_h$ are computed as in Equations (2), (3) and (4):

$$Q_h = \text{reshape}(W^Q V) \tag{2}$$

$$K_h = \text{reshape}(W^K V) \tag{3}$$

$$V_h = \text{reshape}(W^V V) \tag{4}$$

where $Q_h$ and $K_h$ have the same dimension of (B*H)×S×(D/H).

At 106, the system applies a Gaussian weighted function to the generated score matrix.

For example, the system 200 multiplies score matrix with Gaussian weighted (G. W.) function 218 to fade out scores proportional to their distance to target frame. Gaussian weighted matrix can be constructed as in Equation (5).

$$G = \begin{bmatrix} g_{1,1} & g_{1,2} & \cdots & g_{1,S} \\ g_{2,1} & g_{2,2} & \cdots & g_{2,S} \\ & \vdots & & \\ g_{S,1} & g_{S,2} & \cdots & g_{S,S} \end{bmatrix}, \quad g_{i,j} = e^{-\frac{|i-j|^2}{\sigma^2}} \tag{5}$$

The diagonal of the Gaussian matrix has the highest value and its weights equally decay from left to right directions. The Gaussian matrix in Equation (5) is element-wise multiplies with the score matrix as in Equation (6).

$$S_h = G \odot \left(\frac{Q_h K_h^T}{\sqrt{d}}\right) \tag{6}$$

The system 200 may apply the Gaussian weighted function as in Equation (7).

$$O_i = (\text{SoftMax}(G \odot |S_h|))V_h \tag{7}$$

Equation (7) is an element-wise multiplication of the Gaussian matrix with the absolute value of the score matrix. For Equation (7), the absolute value of $S_h$ is used for softmax input and its sign is compensated after softmax output. The reason for this two-step approach is that unlike typical NLP tasks as negative correlation in signal estimation is as important as positive correlation. Gaussian weighting before the softmax function attenuates correlation values regardless of their sign. By taking absolute value of the score, self attention will only depend on score magnitude. Later, when the $V_h$ matrix is combined, the system compensates its sign by multiplying sign matrix, Sign($S_h$)

The system 200 may apply the Gaussian weighted function as in Equation (8).

$$O_i = (\text{SoftMax}(G \odot |S_h|) \odot \text{Sign}(S_h))V_h \tag{8}$$

Equation (8) is an element-wise multiplication of the Gaussian matrix with the absolute value of the score matrix and its sign is compensated after the softmax function. Equation (8) does not compensate the sign later. Since $V_h$, $Q_h$, $K_h$ are trainable matrices, they can find proper sign even without explicit sign compensation.

The system 200 may apply the Gaussian weighted function as in Equation (9).

$$O_i=(\text{SoftMax}(G\odot S_h))V_h \tag{9}$$

Equation (9) is an element-wise multiplication of the Gaussian matrix with the score matrix. Equation (9) does not take absolute function of score matrix by the expectation that score function can learn to flip negative sign. Each of Equations (7), (8) and (9) apply the softmax operation 220 shown in FIG. 2. The system performs a batch matrix multiplication 222 with the output of the softmax operation 220 and the output of the reshape operation 214. The system performs a reshape operation 224 on the output of the batch matrix multiplication 222. The system performs a batch matrix multiplication operation 226 with the output of the reshape operation 224 and $W^{OUT}$ to produce the output 228.

Alternatively, the Gaussian weight function 218 may be applied after the softmax operation 220 as in Equation (10).

$$O_i=\left(G\odot SoftMax\left(\frac{Q_hK_h^T}{\sqrt{d}}\right)\right)V_h \tag{10}$$

In Equation (10), positive correlation is used because negative correlation would be ignored after the softmax function.

Figure 3:
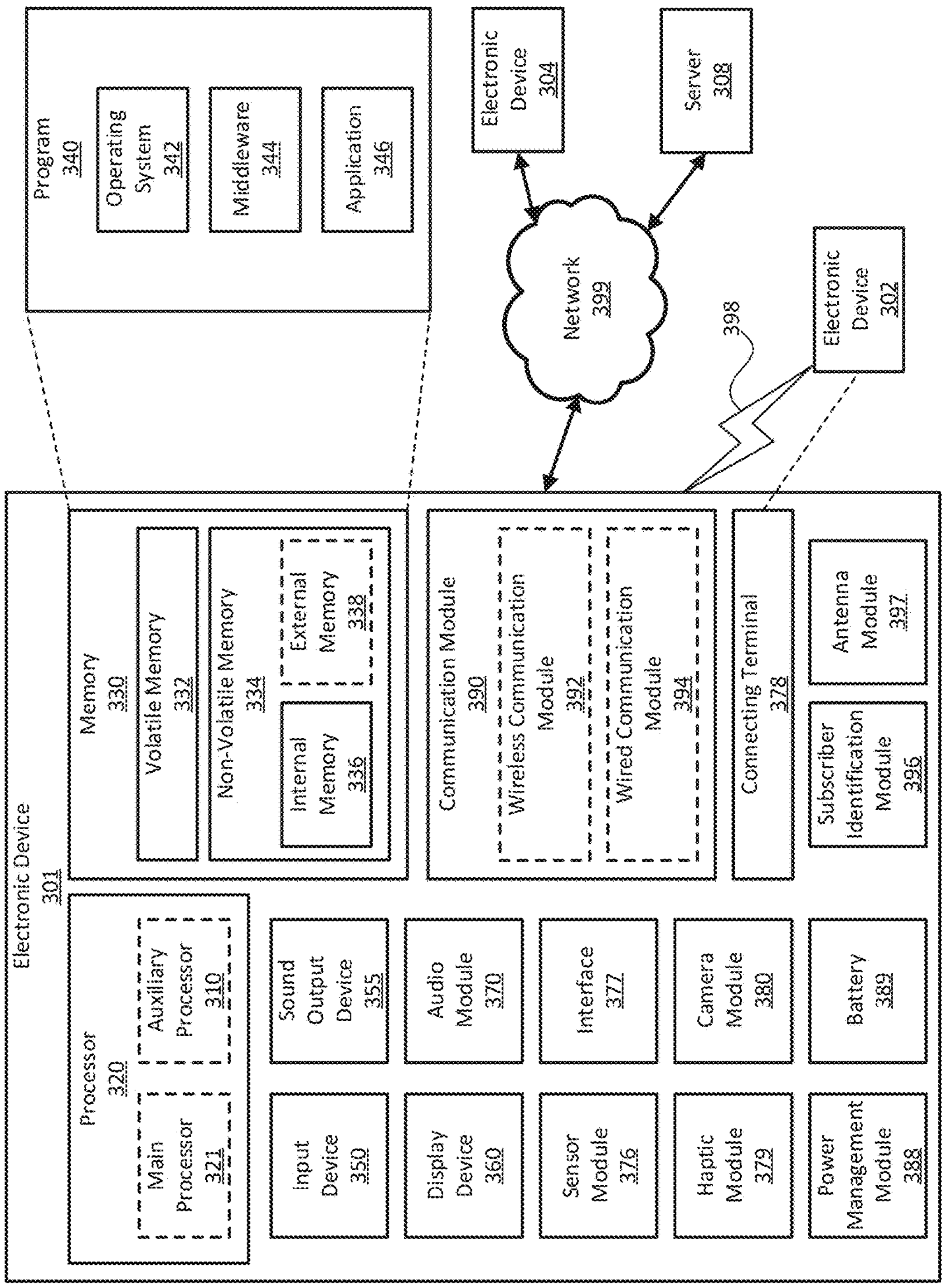
FIG. 3 illustrates a block diagram of an electronic device in a network environment, according to one embodiment.

FIG. 3 illustrates a block diagram of an electronic device 301 in a network environment 300, according to one embodiment. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In one embodiment, at least one (e.g., the display device 360 or the camera module 380) of the components may be omitted from the electronic device 301, or one or more other components may be added to the electronic device 301 in one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wired) or wirelessly. According to one embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, image signal processors, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. According to one embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to one embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for Gaussian weighted self-attention for speech enhancement, comprising:

receiving an input noise signal;

generating a score matrix based on the received input noise signal; and applying a Gaussian weighted function to the generated score matrix by compensating for a sign after a softmax function.

2. The method of claim 1, wherein the score matrix is generated based on a query matrix and a key matrix.

3. The method of claim 1, wherein applying the Gaussian weighted function to the generated score matrix further includes multiplying the score matrix by a Gaussian weighted matrix.

4. The method of claim 1, wherein applying the Gaussian weighted function to the generated score matrix further includes multiplying a Gaussian matrix element-wise with an absolute value of the score matrix.

5. The method of claim 1, wherein applying the Gaussian weighted function to the generated score matrix further includes multiplying a Gaussian matrix element-wise with the score matrix.

6. The method of claim 1, further comprising applying the softmax function to an output produced by applying the Gaussian weighted function to the generated score matrix.

7. The method of claim 1, further comprising applying the softmax function to the generated score matrix prior to applying the Gaussian weighted function to the generated score matrix.

8. The method of claim 1, wherein the Gaussian weighted function comprises a Gaussian weighted matrix.

9. The method of claim 8, wherein the Gaussian weighted matrix is $$G = \begin{bmatrix} g_{1,1} & g_{1,2} & \cdots & g_{1,S} \\ g_{2,1} & g_{2,2} & \cdots & g_{2,S} \\ & \vdots & & \\ g_{S,1} & g_{S,2} & \cdots & g_{S,S} \end{bmatrix}, \text{ where } g_{i,j} = e^{-\frac{|i-j|^2}{\sigma^2}}.$$

10. A system for Gaussian weighted self-attention for speech enhancement, comprising:

a memory; and a processor configured to:

receive an input noise signal, generate a score matrix based on the received input noise signal, and apply a Gaussian weighted function to the generated score matrix by compensating for a sign after a softmax function.

11. The system of claim 10, wherein the score matrix is generated based on a query matrix and a key matrix.

12. The system of claim 10, wherein the processor is further configured to apply the Gaussian weighted function to the generated score matrix by multiplying the score matrix by a Gaussian weighted matrix.

13. The system of claim 10, wherein the processor is further configured to apply the Gaussian weighted function to the generated score matrix by multiplying a Gaussian matrix element-wise with an absolute value of the score matrix.

14. The system of claim 10, wherein the processor is further configured to apply the Gaussian weighted function to the generated score matrix by multiplying a Gaussian matrix element-wise with the score matrix.

15. The system of claim 10, wherein the processor is further configured to apply the softmax function to an output produced by applying the Gaussian weighted function to the generated score matrix.

16. The system of claim 10, the processor is further configured to apply the softmax function to the generated score matrix prior to applying the Gaussian weighted function to the generated score matrix.

17. The system of claim 10, wherein the Gaussian weighted function comprises a Gaussian weighted matrix.

18. The system of claim 17, wherein the Gaussian weighted matrix is $$G = \begin{bmatrix} g_{1,1} & g_{1,2} & \cdots & g_{1,S} \\ g_{2,1} & g_{2,2} & \cdots & g_{2,S} \\ & \vdots & & \\ g_{S,1} & g_{S,2} & \cdots & g_{S,S} \end{bmatrix}, \text{ where } g_{i,j} = e^{-\frac{|i-j|^2}{\sigma^2}}.$$

* * * * *